Figure 1:
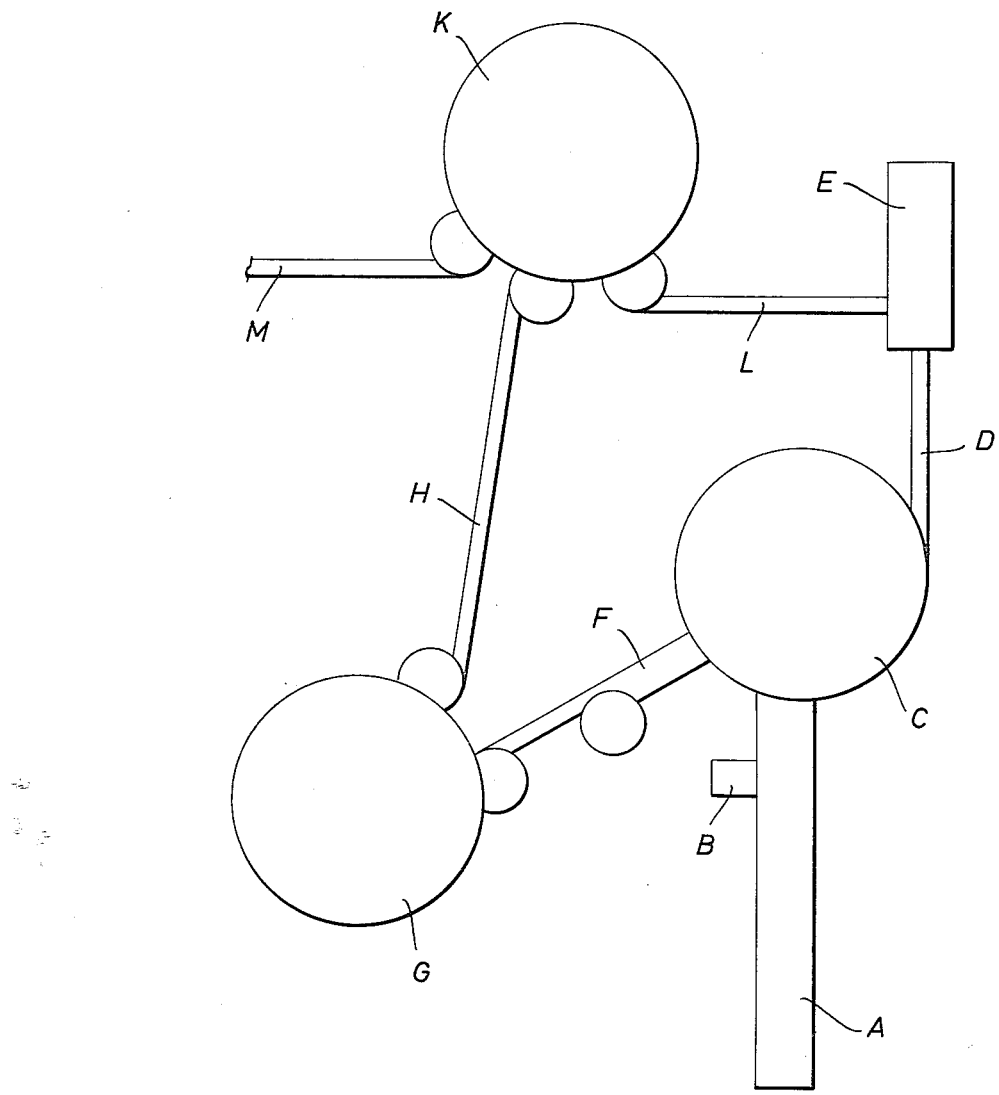

June 11, 1963 H. PAAL 3,092,943
MACHINE FOR PRODUCING FILLED PACKAGES, PARTICULARLY
LIQUID-FILLED PACKAGES
Filed July 24, 1961 10 Sheets-Sheet 4
FIG. 4
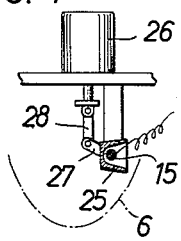
FIG. 5
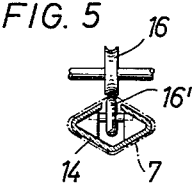
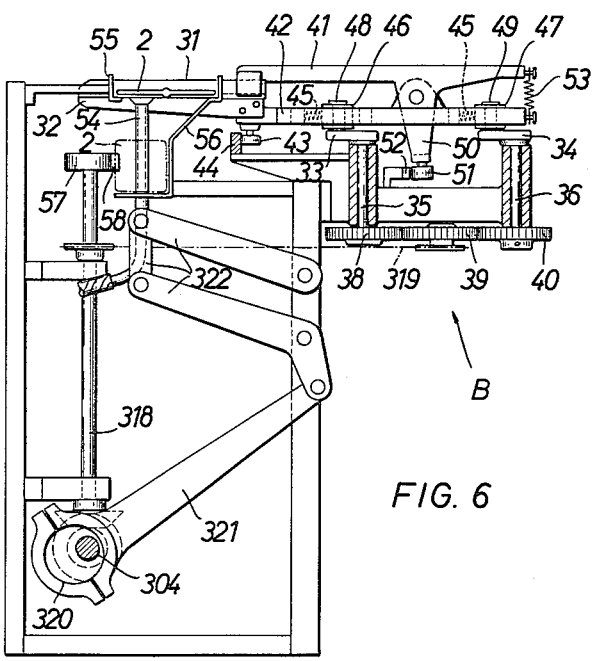
FIG. 6
FIG. 7
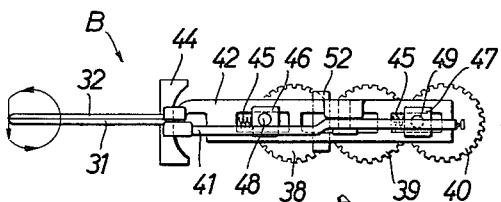
FIG. 13
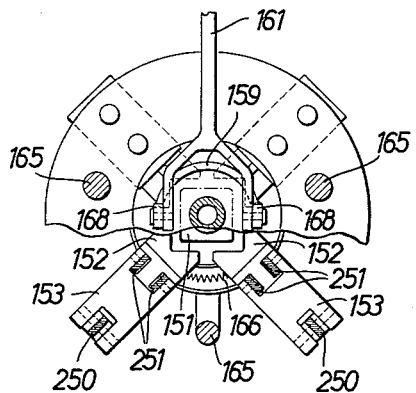
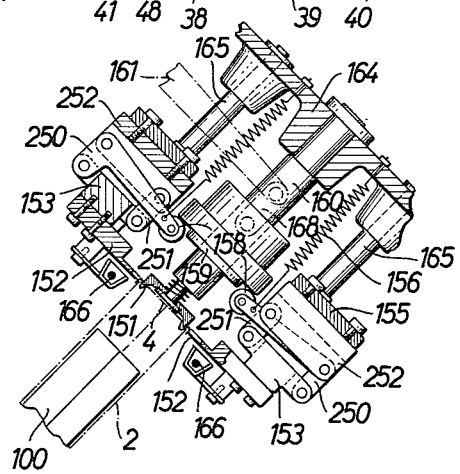
FIG. 12

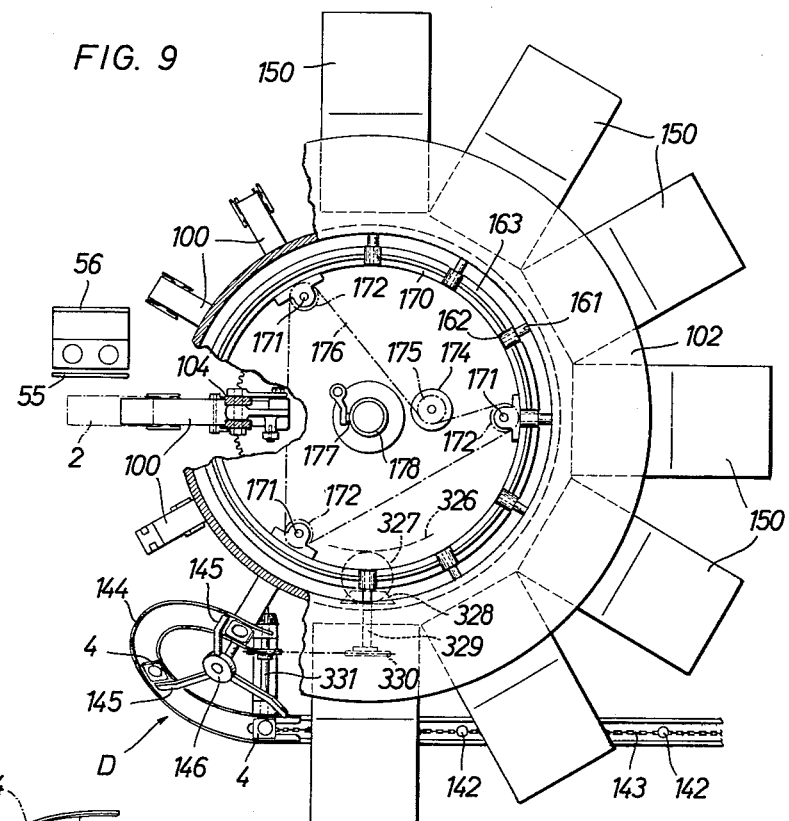
FIG. 9
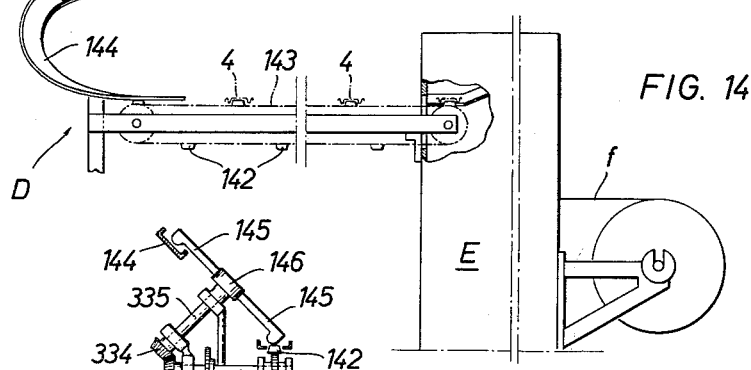
FIG. 14
FIG. 15

United States Patent Office 3,092,943
Patented June 11, 1963

3,092,943
MACHINE FOR PRODUCING FILLED PACKAGES, PARTICULARLY LIQUID-FILLED PACKAGES
Hans Paal, Waiblingen, Wurttemberg, Germany, assignor to Firma Fr. Hesser Maschinenfabrik-Aktiengesellschaft, Stuttgart-Bad Cannstatt, Germany, a corporation of Germany
Filed July 24, 1961, Ser. No. 126,020
Claims priority, application Germany July 25, 1960
25 Claims. (Cl. 53—183)

This invention relates to a machine for producing packages filled with contents of all kinds, and particularly with liquids, such packages being of the kind consisting of filled containers each comprising a sleeve-form body portion and top and bottom covers secured thereto in a fluid-tight manner.

A machine for producing packages of this kind is known in which the sleeve-form body portions are taken in flattened condition from a magazine, are opened and introduced into receptacles of an intermittently operable conveyor device in which receptacles the opened body portions are provided with bottom closure portions, are thereafter, transferred into a further conveyor device, and are eventually furnished with top closure portions. The top and bottom closure portions for these packages are constituted by punched out cardboard blanks, which are likewise assembled in supply magazines, and, during their supply to the sleeve-form body portions, are first deformed into trough shape, then inserted into the open top and bottom ends of the body portions, and finally cemented to the latter.

In addition, there is a known machine in which the body portions are shaped from blanks by folding around mandrels of an intermittently rotated mandrel wheel suchwise as to form longitudinal seals, bottom covers being introduced, in the manner described above, into the body portions whilst they are still mounted on the mandrels. After transfer in a further conveyor device the containers, thus produced and with their tops still open, are filled and thereafter provided with top covers.

A disadvantage of these known machines lies in the fact that the individual operating steps for producing the packages are performed on stationary assemblies to which the package parts are intermittently fed. These intermittent working steps involve, however, a definite limitation of output which can not be substantially increased.

The object of the present invention is to avoid these limitations by the provision of a package-producing machine which fabricates, fills and closes containers in a continuously operating procedure and at a high rate of output, starting from packaging material which is fed in from a reel.

The machine according to the invention includes, in combination, a supply reel carrying packaging material in strip form, a device operable for continuously forming tubing with an overlap seam from said material fed from the supply reel, a mechanism which travels with said tubing for a predetermined distance and is operable for separating therefrom sleeve-form container body portions, a continuously rotating mandrel wheel, mandrels mounted on said wheel, movable grippers with which said mandrels are equipped, a device which functions to transfer the continuously separated container body portions to the mandrels, the aforesaid grippers functioning to draw the said body portions on to the mandrels, a feed device associated with the mandrel wheel for feeding thereto, preformed container bottom covers, a mechanism comprising a continuously rotating series of devices associated with the mandrels and operable for welding said bottom covers on to the container body portions, a filling means succeeding the mandrel wheel for filling the containers with contents, a mechanism following said filling means and operable for welding preformed top covers on to the filled but still open containers to close the same, and a feed device associated with the said top cover welding mechanism for feeding thereto said top covers.

There is also a known form of machine in which a tube is formed from a strip of tubing material, but this is separated into flat bags, and the latter are drawn on to the mandrels of a mandrel wheel so as to shape them into block bottom bags and to fold outer cartons around them. This machine operates intermittently, the flat bags being fed in along the longitudinal axis of a mandrel, and drawn on to the latter, whilst the mandrel wheel is stationary.

In contrast to this, and in accordance with a further feature of the invention, the longitudinal medial axis of the tube forming device is offset relatively to the central axis of the mandrel wheel, the relative arrangement of this device and wheel being such that the mandrels of the continuously rotating series first run against the leading margins of the rear side walls (as seen in the direction of travel of the mandrels) of the container body portions separated from the packaging strip, and as a result so tilt these body portions that their longitudinal axes come into alignment with the relevant mandrels, the movable grippers of each mandrel in turn closing in this position and then drawing the engaged body portion on to the mandrel.

In accordance with a further feature of the invention, the mandrels are arranged for pivoting on the mandrel wheel transversely in relation to the direction of rotation thereof, so as to bring the body portions held thereby into operating engagement with the bottom cover welding mechanism.

Figure 2:
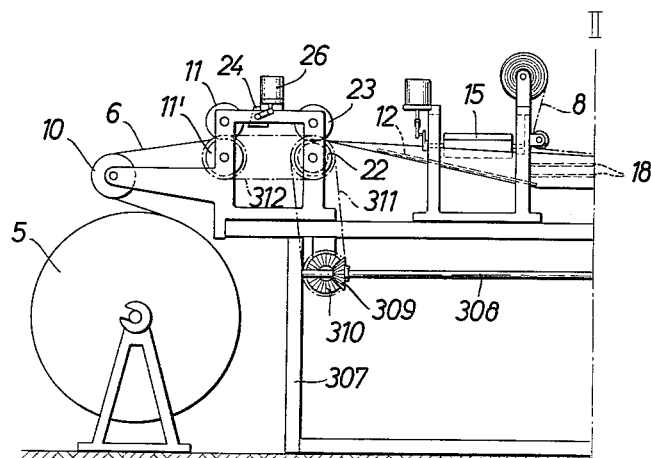
Figure 2:
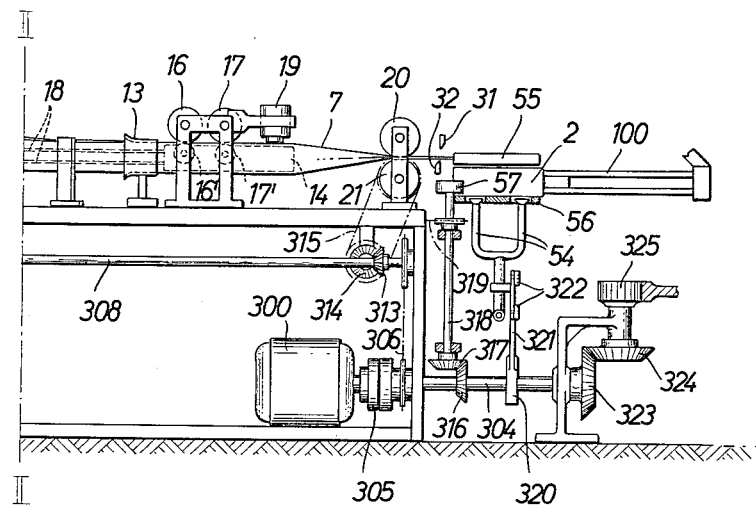
Figure 3:
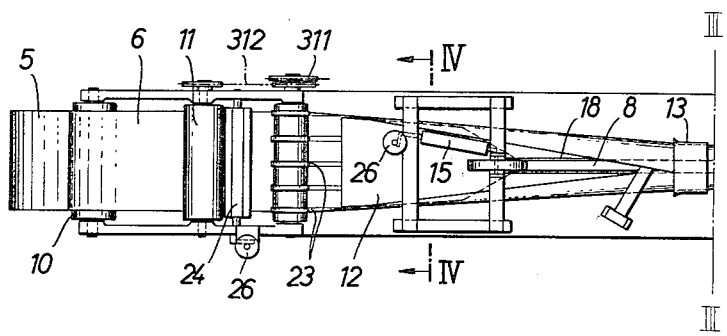
Figure 3:
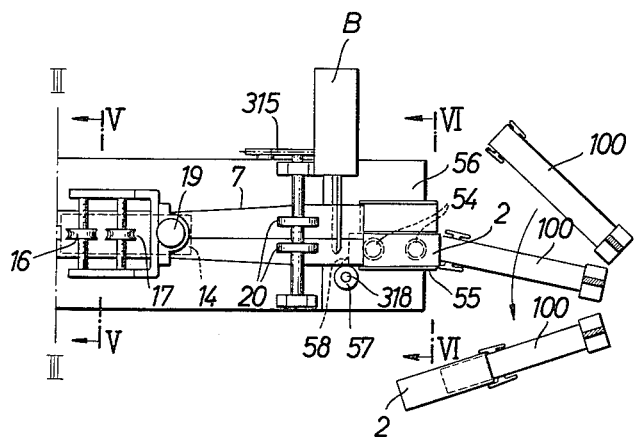
Figure 8:
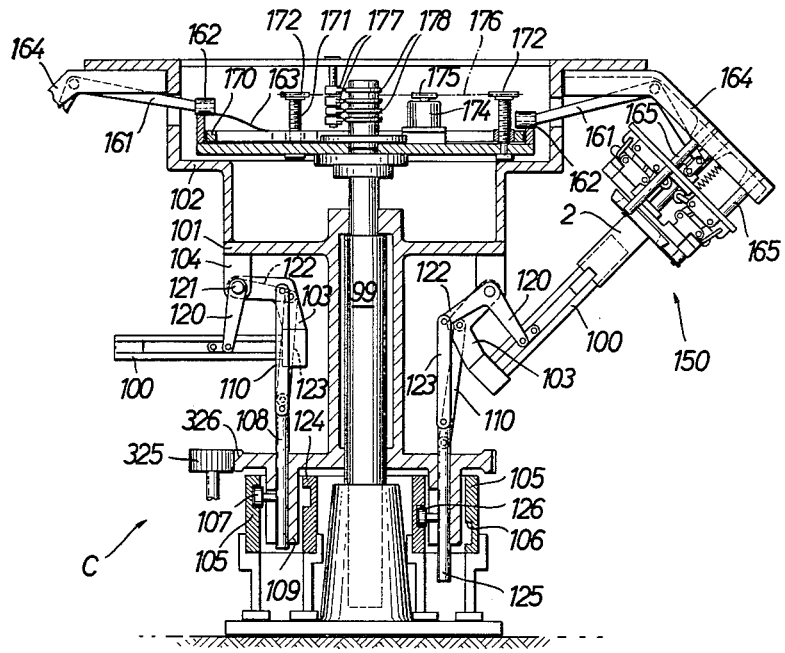
Figure 10:
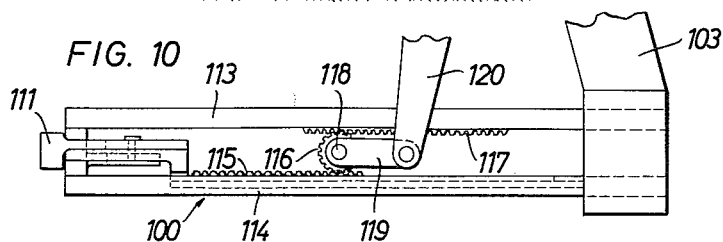
Figure 11:
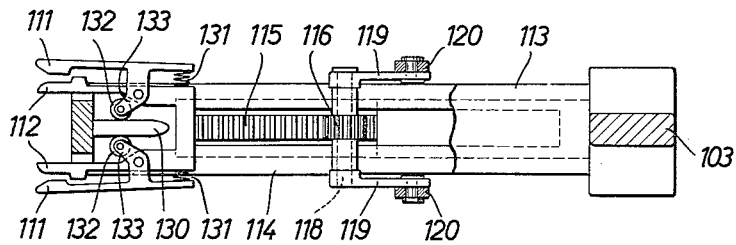
Figure 16:
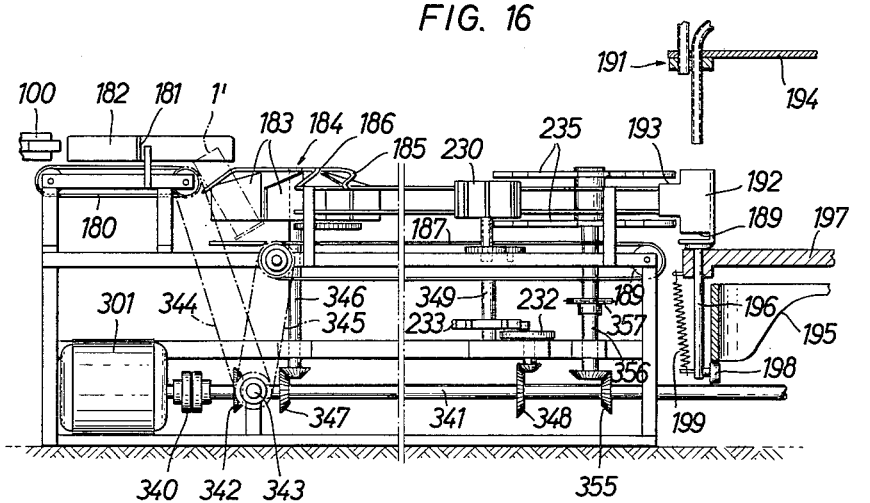
Figure 17:
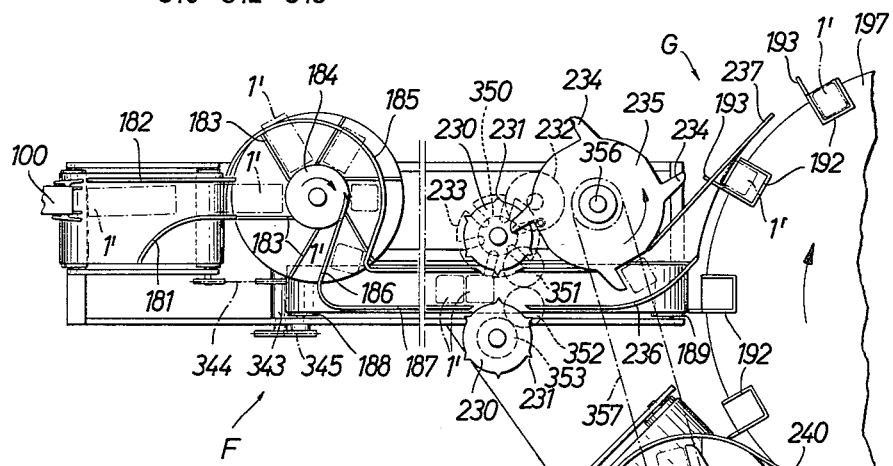
Figure 18:
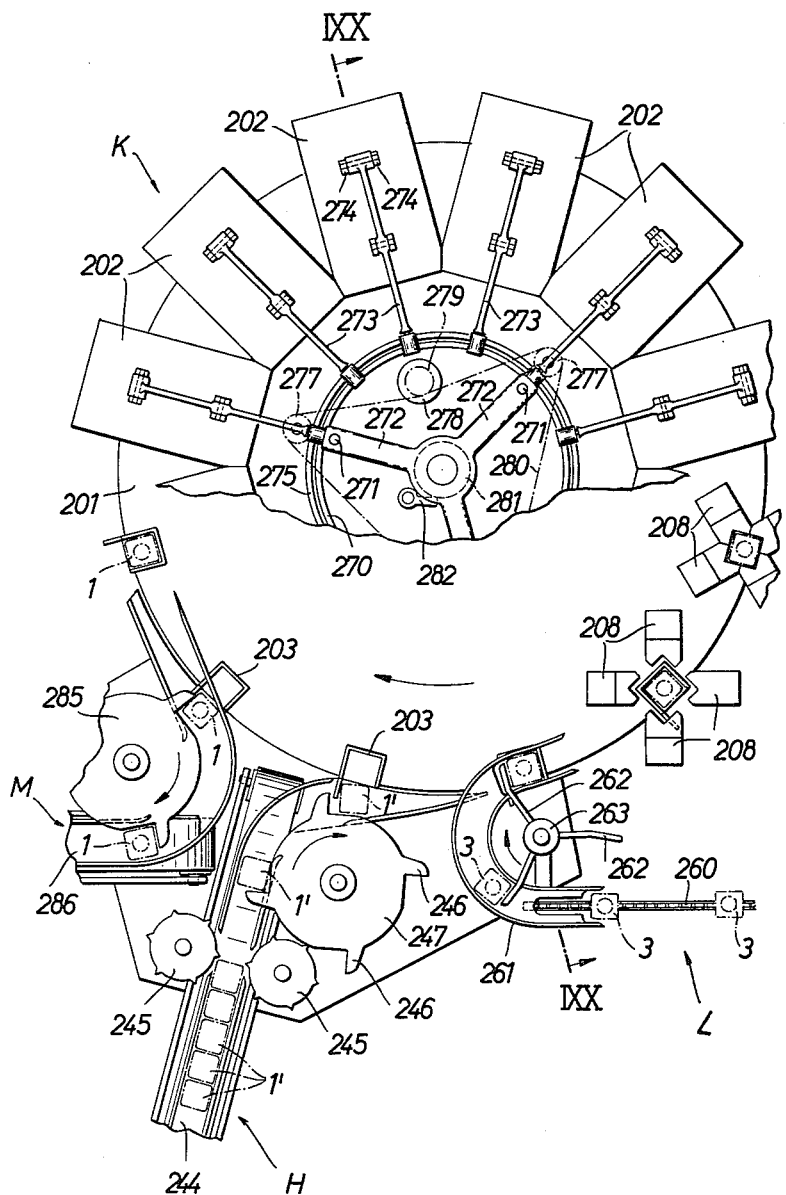
Figure 19:
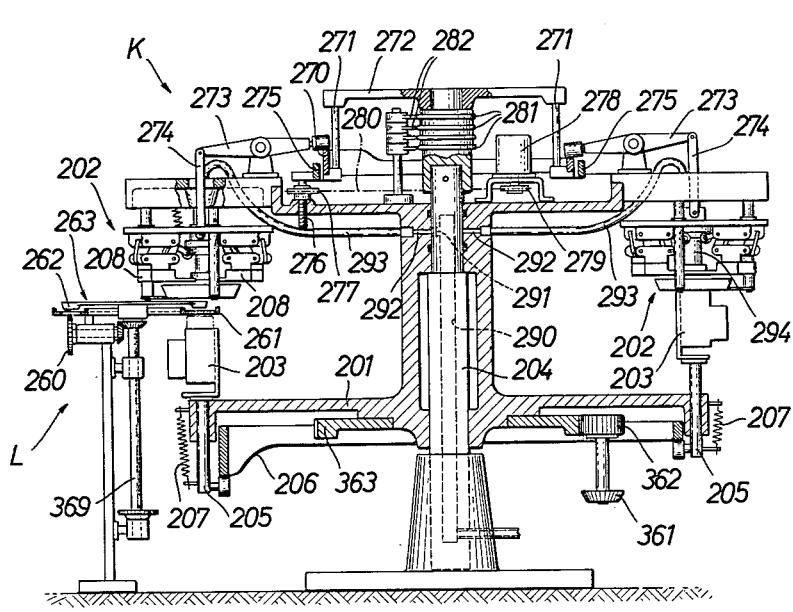
Figure 20:
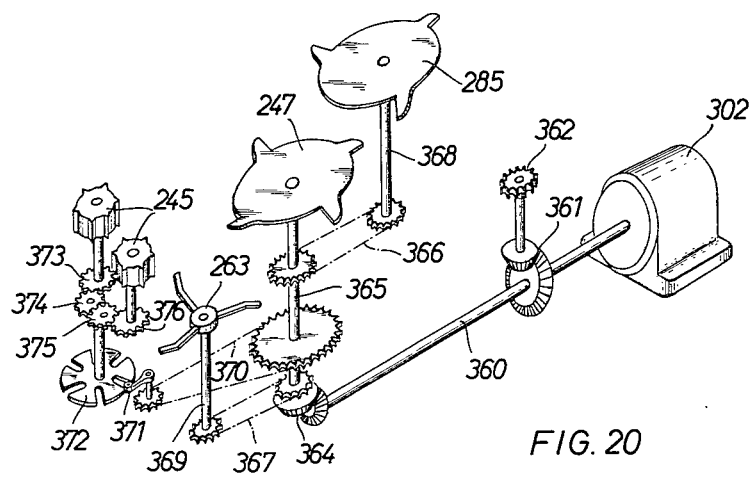
Figure 21:
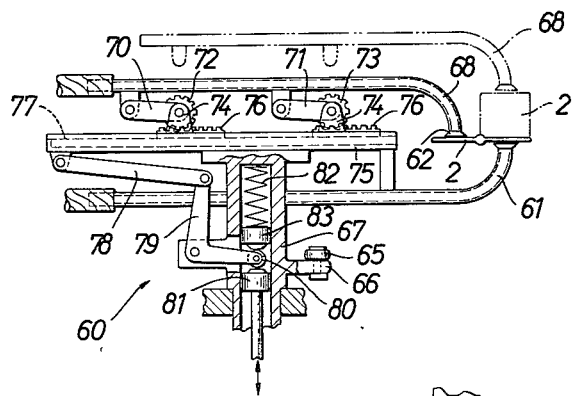
Figure 22:
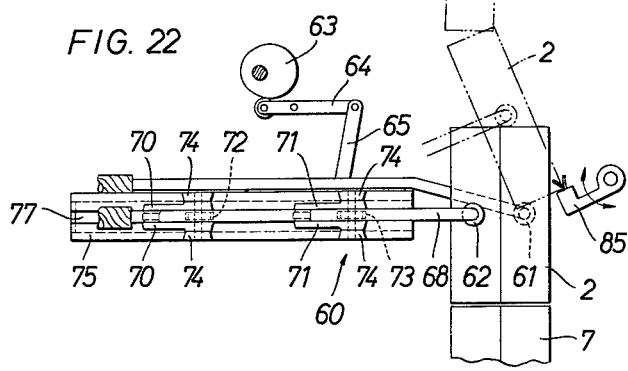
Figure 23:
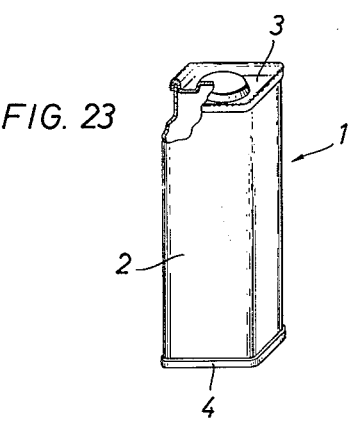

Further feautres of the invention are disclosed in the accompanying drawings illustrating a preferred embodiment of the invention, which will now be described. In these drawings:

FIGURE 1 is a diagrammatic plan of the machine,
FIGURE 2 is an elevational view of a device for forming a tube from a strip of packaging material,
FIGURE 3 is a plan of the device illustrated in FIGURE 2,
FIGURE 4 is a cross-sectional detail of the device depicted in FIGURE 2, taken on the line IV—IV of FIGURE 3,
FIGURE 5 is a partial cross section of a detail of the device of FIGURE 2, this being taken on the line V—V of FIGURE 3,
FIGURE 6 is a front view on the line VI—VI of FIGURE 3, and on a larger scale, of a mechanism for separating the tubular bodies from the tubing,
FIGURE 7 is a plan view of the separating mechanism of FIGURE 6,
FIGURE 8 is a cross-sectional illustration of a mechanism provided with mandrels, for fastening the bottom covers to the body portions of the packages,
FIGURE 9 is a plan view, partly in section, of the mechanism of FIGURE 8, and of a feed device for the bottom end covers,
FIGURE 10 is a side view, on a larger scale, of a mandrel,
FIGURE 11 is a plan view of the mandrel according to FIGURE 10, partly cut away,
FIGURE 12 is an enlarged cross sectional illustration of a bottom cover welding mechanism,
FIGURE 13 is a plan view, partly cut away, of the bottom welding mechanism of FIGURE 12,
FIGURE 14 is a side view of the bottom cover feed device,
FIGURE 15 is a cross section of a part of the bottom cover feed device, FIGURE 16 is a side view of a device for transferring the containers, with the tops still open, to a filling means, FIGURE 17 is a plan view of the assembly illustrated in FIGURE 16, FIGURE 18 is a plan view, partly cut away, of a means for closing the filled containers, FIGURE 19 is a cross section, taken on the line IXX—IXX of FIGURE 18, illuustrating the means of FIGURE 18, FIGURE 20 is a diagrammatic perspective illustration of the means depicted in FIGURE 18, FIGURE 21 is a side view, partly in section, of a device for transferring a container body portion, FIGURE 22 is a plan view of the device illustrated in FIGURE 21, and FIGURE 23 is a perspective view of a finished package.

The embodiment illustrated is intended for the production of filled packages of substantially square cross section and made up of a sleeve-form body portion 2, a top cover 3, and a bottom cover 4 (FIGURE 23). The body portion 2 is preferably made of cardboard lined with a heat sealing plastic, whilst the covers 3, 4 are preferably made of deformable thermoplastic material such, for example, as polyethylene. The body portion 2 is welded to the covers 3, 4 in the machine, using heat and pressure, so as to form a sealed package 1.

To permit the production of complete packages 1, the machine is sub-divided into various units. Starting from the delivery of the finished product, there is first of all a device A for forming tubing from a strip, the body portions 2 of the packages being separated from this tubing by means of a separating mechanism B. Bottom covers 4 are welded into these body portions 2 in a mechanism C, these bottoms 4 being supplied by a feed device D from a shaping and punching mechanism E. The body portions 2, each furnished with a bottom cover 4, and hence open at the top, pass via a conveyor device F to a filling means G. Thence, the containers, now filled, pass via a feed device H to a closure means K in which they are provided with the top covers 3, these covers being supplied from a shaping and punching mechanism E via a feed device L. The finished packages 1 leave the machine by way of a conveyor device M.

In producing the body portions 2 at the mechanism A, a tube 7 is first formed from strip 6. The strip 6 is drawn by a pair of draw rollers 11, 11' from a supply reel 5 via a diverting roller 10, is then passed around a folding plate 12 to be folded into U-form, and is carried through a guide sleeve 13 to form it into a tube, thereafter being applied around a stationary shaping mandrel 14 so that the two free marginal zones of the strip overlap. To ensure that the overlap seam thus formed is self-cementing, one marginal zone of the strip 6 is previously supplied with infra-red heat by means of a radiant heater 15 so that, during the subsequent pressing of this overlap seam by means of pairs 16, 16', 17, 17' of pressing rollers, a firm and liquid-tight joint is formed.

It is also possible to introduce at the inner side of the overlap seam of the tube 7, in known fashion, a strip 8 of a heat sealable plastic sheet, for example polyethylene, which adheres against the inner side of the said seam to form an inner liquid seal.

A stationary electromagnet 19 is used for performance of the pressing of the overlap seam between the pairs of rollers 16, 16', 17, 17', which are not heated, this magnet being arranged on two leaf springs 18 for producing the required counter balance at the opposed ends of the suspension of the mandrel, and serving to magnetically attract the mandrel carrying the rollers 16' and 17' against the rollers 16 and 17. Adjoining the shaping mandrel 14, which preferably is of rhombic cross section, is a pair of draw rollers 20, 21 which pull the tubing 7 continuously forwards, this tubing being almost completely flattened.

To provide for an improved formation of the edges of the body portion 2, there are associated with the pair of draw rollers 11, 11' a roller 22, formed with annular grooves, and a roller formed with complementary annular ribs 23 engaging in the said grooves, these interengaged rollers preliminarily die-forming the strip 6 in the vicinity of what will later be the edges of the container body. To facilitate this procedure, the strip 6 may be pre-heated by means of a preceding radiant heater 24. To prevent burning of the strip 6 by the heaters 15 and 24 in the event of the machine coming to a standstill, these heaters, and preferably their reflectors 25, are mounted for pivtal movement about their respective longitudinal axes. Each reflector 25 is coupled, through levers 27, 28, to an electromagnet 26 which becomes de-energised if the forward draw of the strip is interrupted, thereby to cause the reflector to pivot away from the strip 6.

Equal lengths of tubing are cut off the continuously-shaped tube 7 at regular intervals, in accordance with the particular speed of forward draw of the strip 6 prevailing at any time, by means of the separating mechanism B and, after being opened, these lengths (which are to form the body portions 2) are transferred to the mandrels 100 of the mechanism C for inserting and welding thereon the bottom covers 4.

The separating mechanism B (FIGURES 6 and 7) is arranged in the machine in such a way that it accompanies and travels at the same speed as the tubing 7 during the cutting process. For this purpose the mechanism B, which comprises an upper and a lower knife blade, 31 and 32 respectively, is mounted on crank arms 33, 34 mounted on shafts 35, 36 which are continuously driven through toothed wheels 38, 39, 40. To ensure that the cutting blades 31, 32, during the cutting operation, perform a rectilinear movement in the direction of travel of the tubing 7, and not an arcuate movement, a roller 43 is arranged on the lower arm 42 of two arms 41 and 42 carrying the blades 31, 32 and runs against a correspondingly shaped stationary cam rail 44. Furthermore, the coupling between the cranks 33 and 34 and the associated arm 42 is made flexible, by virtue of the fact that slide blocks 46, 47 are mounted in this arm 42 so as to be movable transversely to the direction of travel of the strip, are supported by springs 45, and are mounted on crank pins 48, 49 of the cranks 33, 34.

Each body portion 2 is severed by pivoting the upper cutter blade 31 relatively to the lower blade 32 which remains relatively fixed. For this purpose the arm 41 carrying the upper blade 31 is mounted on the lower arm 42 and has a lever arm 50 carrying a roller 51. During the rectilinear motion of the blades 31, 32 in the direction of travel of the tubing, this roller 51 runs over a fixed cam rail 52 which has a raised portion and performs a cutting movement against the draw action of a spring 53 engaging the arms 41, 42. The body portions 2, so separated, are suctionally engaged at one side wall by a pair of suction members 54, which reciprocate synchronously with the machine operation, and are drawn down into a folding frame 55, 56 so as to be brought to a square cross section.

The arrangement of these mechanisms is such that the longitudinal axis of the device A for forming the tubing 7 is offset relatively to the medial axis of the mechanism C for inserting and securing the bottom covers 4. As a result, the continuously-rotating mandrels 100 of the bottom cover welding mechanism C run against the inner, leading margin of the rear side wall (as seen in the direction of travel of the mandrels 100) of the body portion 2 which has been prepared in the folding frame 55, 56 (FIGURE 3). In the further development of the operation, this body portion 2 is rocked by the corresponding mandrel 100 until the longitudinal axis of the body portion 2 and the mandrel 100 coincide. At this moment a pair of jaws 111, 112, arranged in the mandrel 100, grip the body portion 2 and pull it on to the mandrel.

Whilst the mandrel 100 is being passed into the leading open end of the body portion 2, the rear open end of the latter is supported by the nose 58 of a rotating counter holder 57 and advanced a little towards the mandrel 100 so as to facilitate its slipping thereover.

A further embodiment of the device for transferring the body portions 2 to the mandrels 100 is illustrated in FIGURES 21 and 22. In this construction the axes of the tube forming device A and the bottom cover welding mechanism C may intersect. In this case the transfer of the severed body portions 2, accompanied by opening out thereof into square cross section, is performed by suction members 61, 62 forming part of a transfer device 60. This latter is mounted on the machine so as to be pivotable within a predetermined angular range, and is operated so that each body portion 2 is held by the suction members 61, 62 during severance from the tubing 7, is drawn away in accelerated fashion from the cut end of the tubing, and is swung away out of the path of forward travel of this tubing. At this juncture, the body portion 2 is at an obtuse angle to the mandrel 100, which has not yet come into the axial direction of the mechanism 12 to 17 forming the tubing, so that in this position one edge of the leading open end of the body portion is located in the path of travel of the mandrel 100 (shown in dotted lines in FIGURE 22. As this mandrel continues to travel, the body portion 2, with its rear end supported by means of a pivotable counter holder 85, is pushed partially on to the mandrel and is then engaged by grippers 111, 112 arranged in the mandrel and drawn completely on to the latter. Whilst this is going on, the transfer device 60 pivots back into its rear dead central position from which it is accelerated forwards again for engaging the next body portion 2.

The pivotal movements of the transfer device 60 are brought about in the present example by means of a cam operating means comprising an edge cam 63 and a lever system 64, 65, 66, of which the lever 66 is firmly connected to the bearing shaft 67. The upper suction member 62 is arranged for arcuate pivoting so as to perform the opening of the body portion 2 during its transfer to a mandrel 100. To this end the suction pipe 68 of the suction member concerned is mounted on levers 70, 71 respectively rigidly connected to pinions 72, 73. These pinions 72, 73 are mounted in bearings 74 secured to a guide rail 75 and are each in mesh with a separate rack 76. The two racks 76 are carried by a bar 77 which is displaceable in the guide rail 75 and coupled by a lever system 78, 79 and a roller 80 with a plunger 81 and a piston 83, against which bears a spring 82, these being accommodated in an axial bore in the bearing shaft 67.

To weld the bottom covers 4 into the body portions 2 drawn on to the mandrels 100, these mandrels are mounted for pivoting in the vertical plane, so that, in their upper position, they are directed towards welding heads 150. To implement this, the mandrels 100 are mounted by means of angle arms 103 in bearing eyes 104 in a drum or a mandrel wheel 101 rotatable about an axis 99, so as to be pivotable between two end positions (FIGURE 8). To take over and shift the body portions 2, the mandrels 100 are in their horizontal position, and for applying and welding the bottom covers 4 to the body portions 2 they are inclined and directed upwardly towards a welding head 150 which is arranged on the mandrel wheel 101 at this location. This arrangement affords a very compact, but nevertheless readily supervised, arrangement of the parts.

The production of the aforesaid pivotal movements of the mandrels 100 is effected during the travel of the mandrel wheel 101 by a fixed cam ring 105 in the cam groove 106 in which runs a roller which is associated with each mandrel and is fastened to vertical bar 108. Each vertical bar 108 is axially displaceable in bushes 109 of the mandrel wheel 101 and is coupled by a link 110 to the aforesaid arm 103 of the relevant mandrel 100 so that, during downward movement of the bars 108, the mandrels 100 are pivoted upwards, and vice versa.

As stated above, the mandrels 100 have longitudinally displaceable grippers 111, 112 for drawing on and pushing off the body portions 2 (FIGURES 10 and 11) and they surround an upper rail 113 and a lower rail 114, the latter having a slideway for a reciprocable rack 115 carrying the grippers 111, 112. Meshing with the rack 115 is a pinion 116 which, in turn, meshes with a rack 117 fastened to the lower rail 114. This pinion 116 is mounted on a pin 118 carried by two bars 119 linked to levers 120. One of the levers 120, which is firmly mounted on the bearing pins 121 of the bearing eyes 104, has a cranked portion 122 which is connected by a link 123 to a vertically-displaceable bar 125 operable by a fixed cam ring 124 through a roller 126 (FIGURE 8). The longitudinal displacement of the grippers 111, 112 is brought about by the reciprocating movement of each bar 125.

The opening and closure of these grippers, each of which is made up of a relatively rigid clamping jaw 112 and a second clamping jaw 111 which is mounted on the first and is pivotable relatively thereto, is effected during the aforesaid longitudinal shifting movement by means of a tongue 130 which is fastened at the leading end of the mandrel 100 (FIGURE 11). During the outward movement of the grippers 111, 112, rollers 132 on arms 133 of the clamping jaws 111 run on the tongues 130 to produce the opening of the grippers. These grippers close under the action of springs 131 during their inward movement.

As a mandrel 100 swings into the inclined position, after a body portion 2 has been taken over, the latter is drawn on to the mandrel 100 by the grippers 111, 112 only sufficiently to leave a small part of this body portion 2 projecting between the end of the mandrel 100 and the rim of the open end of the said body portion. A bottom cover 4 is then placed on the open end of the body portion 2, in this position, by means of a bottom cover feed device D (FIGURE 9).

These bottom covers 4, as also the top covers 3, are produced by heat formation from thermoplastic sheeting f, and are punched out of the web of this sheeting, in a shaping and punching mechanism E which is common in the art. The bottom covers 4 are provided in this way with U-shaped folded rims. The feed of the said bottom covers 4 to the body portions 2 drawn on to the mandrels 100, is effected by means of the conveyor device D comprising a conveyor chain 143 equipped with driving elements 142, and a semi-circular guide rail 144. The conveyor chain 143 transfers the bottom covers 4, transported thereby, to the guide rail 144, which is U cross section, and the other end of which projects above the path of travel of the inclined mandrels 100. The transport of the covers 4 along the guide rail 144 is then taken over by continuously travelling driving arms 145 which travel with the mandrel wheel 101 in such a way that a bottom cover 4 is placed on the open end of each body portion 2 so that the folded rim of the said cover embraces the bottom edge of the body portion 2.

After a bottom cover 4 has been placed on a body portion 2 on a mandrel 100, the grippers 111, 112 of this mandrel move the said body portion together with its bottom cover into the welding head 150 associated with the mandrel. Each welding head comprises, in essence, a stationary headpiece 151 which accurately fits the folded rim of the bottom cover 4, and welding, i.e. heat sealing, jaws 152 which are arranged for diagonal movement against the corners of the headpiece 151, i.e. against the folded rim of the cover 4, and are triangularly recessed at the end. The welding or heat sealing jaws 152 are brought, from below and by means of an annular radiant heater 166, to a temperature such that when the folded rim of the cover 4 is pressed against the body portion 2, a joint is made which, at the inside of the body portion 2 provided with a heat sealable layer, is very durable and of good sealing quality.

Each of the heat sealing jaws 152 is secured to a link 153, and the latter is hingedly secured to levers 250 251, so as to form a type of parallel linkage system. In turn, the levers 250, 251 are pivotally mounted in a part 252 arranged in a ring 155 which is secured to stay bolts 165. These stay bolts are rigid with a carrier plate 164 secured to the drum 102. The levers 250 have offset arms which are directed towards the centre of the welding head and carry rollers 158. These arms are drawn, under the tension of springs 156, against a sleeve 159. The sleeve 159 is axially movable on a central rod 160 and linked by plates 158 to a forked bell crank lever 161 which, at its other end, carries a roller 162 which is applied against a fixed cam ring 163.

Movement of the heat sealing jaws against the head-piece 151 is effected by an axial displacement of the sleeve 159, the pull of the springs 156 producing the movement and determining the prevailing pressure. The movement of the heat sealing jaws 152 is controlled by the aforementioned cam ring 163 in such a way that there is a weld over more than half the travel of the mandrel 100, and thereafter the heat sealing jaws 152 are restored to their respective positions.

To preclude burning of packages still in the welding head 150 in the event of the machine stopping, a ring 170 which is movable up and down is arranged concentrically in relation to the annular cam 163 and is automatically moved upwards by means of spindles 171 if the machine comes to a stop, and acts against the rollers 162 to pivot the levers 161. By this means the heat sealing jaws 152 and the welding heads 150 are brought out of contact with the rims of the bottom covers 4. Mounted on the spindles 171 are chain wheels 172 and passing around these, and also around a further chain wheel 175 mounted on the shaft of an adjusting motor 174, is a chain 176. As a result of the machine coming to a standstill, this adjusting motor 174 is automatically switched in to bring about the upward adjustment of the ring 170 until it reaches its upper end position.

The supply of electrical current for the radiant heater 166 of the rotating welding heads 150 takes place through sliding contacts 177 turning with the drum 102, and a slip ring 178 on the fixed spindle 99.

After a bottom cover 4 has been welded to a body portion 2, the grippers 111, 112 pull the latter from the welding head 150 and, if required, compressed air can be blown through the headpiece 151 against the bottom cover to assist in removal of the container and for cooling. Thereupon the mandrels 100, under the control of the cam ring 105, swing back into the horizontal position and at the same time the grippers 111, 112 operated by the cam ring 124 push the body portion 2, provided with its bottom cover 4, on to a conveyor device F leading to a filling means G. This conveyor device F includes a conveyor belt 180 which conducts the container 1', now comprising a body portion 2 and a bottom cover 4, with the bottom leading, between two guide cheeks 181, 182, in front of the wing-like propelling members 183 to a conveyor wheel 184. This conveyor wheel 184 circulates continuously and, through the agency of a stationary arcuate rail 185 which is disposed eccentrically in relation to its axis, brings the container 1' into a vertical disposition. A further guide rail 186 then conducts the container 1' from the circulating path of the conveyor wheel 184 to an endless conveyor belt 187 which circulates around rollers 188, 189.

The containers 1' are transferred at regular time intervals from this conveyor belt 187 to a filling means G of a type generally known in this art, and are there filled with the appropriate contents, these being assumed to be liquid in the present example. The exact timing of the feed of the containers 1' is controlled by two rollers 230 which are arranged at either side and above the conveyor belt 187 and have noses 231 projecting into the path of travel of the containers 1'. These rollers are operated synchronously with the machine and by means of a Maltese Cross gearing 232, 233, so as to be moved forwards each time by the width of a container, so releasing one container 1'. Each of these containers 1', released at these exactly determined intervals, is then taken over by a nose 234 of a continuously travelling two-part conveyor wheel 235 and carried between two guide rails 236, 237 in front of a receptacle 192 of the filling means G. These receptacles 192 are open at their front side and have, at the rear wall thereof (as regarded in the direction of travel of the filling means G), a forwardly projecting nose 193 which takes over the containers 1' forwarded by the conveyor wheel 235 and pushes them entirely into the accommodating receptacles 192 with the assistance of the guide rail 237.

Thereupon, the receptacles 192, with the containers 1' accommodated therein, are lifted against the filler heads 191 arranged on an accompanying drum 194 of the filling means G, under the control of a cam ring 195, and are lowered again after having been filled. For this purpose the receptacles 192 are fastened to rods 196 mounted for vertical displacement in a drum 197. At their lower ends the rods 196 have rollers 198 which are applied against the cam ring 195 by tension springs 199.

For the purpose of withdrawing filled containers 1' from the receptacles 192, two super-imposed guide rails 240 project into the path of travel of the receptacles 192, engage the sides of the containers 1' directed towards the centre of their path of travel and push them out of the receptacles 192. One guide rail 240 is arranged at a level slightly above the receptacles 192 and the other above the bottom of these receptacles, which have a recess 189 at this position.

The containers 1', pushed from the receptacles 192, are thereupon engaged by the noses 241 of a continuously circulating conveyor wheel 242 and brought between guide rails 240 and 243 on to a conveyor belt 244.

This conveyor belt 244 forms part of the conveyor device H which conducts the filled containers 1' into the closure means K. The conveyor device H is, in substance, constructed in exactly the same way as the conveyor device F. It also has two rollers 245 which are indexed in synchronism with the machine operation and a conveyor wheel 247, with noses 246, for feeding the containers 1' into the closure means K.

To enable it to accept the container 1', the closure means K (FIGURES 18 and 19) likewise has receptacles 203 which are disposed on a drum 201 continuously rotating about a post 204, as in the case of the filling means G, so that transfer of the containers 1' into the receptacles 203 takes place exactly in the same way as in the case of the filling means G.

The closing of containers 1' to form finished packages 1 is performed in this means K by welding the top covers 3 into the upper open ends of the containers 1'. For this purpose, associated with the closure means is a top cover feed device L which places the top covers on the containers 1' inserted in the receptacles 203.

The top cover feed device L is, in general, constructed in the same way as the device D for feeding the bottom covers, which has been described above, and includes inter alia a conveyor chain 260, an arcuate guide rail 261 and a continuously travelling conveyor wheel 263 equipped with propelling members 262, the only substantial difference being that the top covers 3 are only forwarded in the horizontal plane. The method of operation is just as in the case of the bottom cover feed device D.

After a top cover 3 has been placed on a container 1', the receptacle 203 concerned, which is mounted for vertical displacement in the drum 201 by means of rods 205, is moved upwards by a tension spring 207, under the control of a cam ring 206, so that the container 1' with the top cover 3 laid thereon is pushed into the corresponding welding head 203 arranged horizontally on the drum 201. The welding heads 202 are, in substance, constructed in the same way as the bottom cover welding mechanism C, so that they operate in the manner which has been described above. The welding heads 202, and their heat sealing jaws 208, are controlled by a stationary cam ring 270 which is suspended on rods 271 and a cross bearer 272. The movement produced by the cam ring 270 is transmitted to the sleeves of the welding heads 202 through levers 273 and links 274.

As in the case of the bottom cover welding mechanism C, to ensure that, when the machine comes to a standstill, heat sealing jaws 208 and the welding heads 202 are taken out of contact with the top covers, a ring 275 is arranged on spindles 276. The spindles 276 are screwed into chain wheels 277 coupled by a chain 280. When the machine stops, an electric motor 278 drives the chain 280 through a chain wheel 279 so that the ring 275, and thus the levers 273, are raised.

To enable the top covers 3 to detach more easily from the headpiece of the welding heads 203 after the welding on to the containers 1' has taken place, and also to afford a cooling of the welding seams, a short blast of compressed air is blown on to the top covers through the headpiece before the receptacles descend. The compressed air is fed in through a central duct 290 and a transverse duct 291 in the post 204 and through ducts 292 in the drum 201 which register successively with the transverse duct 291. Flexible pipes 293 are connected to the ducts 292 and open into the hollow rods 294 of the welding heads 202.

The supply of current to the welding heads 202 and to the adjusting motor 278 is derived from stationary slip rings 281, mounted in insulated fashion on the post 204, and sliding contacts 202 turning with the drum 201, and electrical conductors (not shown).

After the top covers have been welded to the containers 1' the packages, now complete, descend with the receptacles 203 and are conducted by a conveyor wheel 285 into the discharge section M of the machine which comprises an endless conveyor belt 286.

The removal of the packages 1 from the receptacles 203 of the closure means K takes place in exactly the same way as has been described in connection with the filling means G.

The machine is driven by three electric motors 300, 301, 302 which are coupled together, so as to achieve a synchronous operation of the individual mechanisms and devices, in the manner of an electrical shaft. The motor 300, which preferably is a driving motor of a type common in the art, drives the mechanisms and devices A, B, C and D for producing the empty containers 1'. To this end the motor 300 is connected through a clutch 305 to a shaft 304 which drives a further horizontal shaft 308 mounted in the frame 307 of the machine, through a chain drive 306. The roller 22, provided with grooves, and from this through a chain drive 312 the roller 11' of the draw roller pair 11, 11' for pulling the strip 6 along, are driven through a bevel gearing 309, 310 and a further chain drive 311. The pair of draw rollers 20, 21 for pulling the formed tubing 7 forwards is driven from the shaft 308 through a bevel gearing 313, 314 and a chain drive 315. To operate the separating mechanism B, the shaft 304 drives a vertical shaft 318 through a bevel gearing 316, 317, and this shaft 318 transmits the power through a chain drive 319 to a toothed wheel 39 of the separating mechanism B. In addition, the counter holder 57 for the body portions 2 is provided on the vertical shaft 318. The up and down movement of the pair of suction members 54 is produced from the shaft 304 by means of an eccentric drive 320, the movement of which is transmitted via a connecting rod 321 to a parallelogram linkage 322 coupled to this pair 54. The continuous rotation of the mandrel wheel 101 is derived from the shaft 304 through a bevel gearing 323, 324 and a pinion 325 on a toothed crown 326 which is fastened to the mandrel wheel 101. For the purpose of driving the bottom cover feed device D, a toothed wheel 327, which drives a shaft 329 through a bevel gearing 328, meshes with the toothed crown 326 of the mandrel wheel 101. This shaft 329 is coupled by a chain drive 330 to a shaft 331 to which is secured, on the one hand, a chain wheel 332 for the conveyor chain 143, and, on the other hand, a bevel wheel 333. The bevel wheel 333, through a further bevel wheel 334, drives a shaft 335 which is inclined at an angle of 45° and to which the conveyor wheel 146 is fastened.

The driving motor 301 is used to operate the filling means G and the conveyor device F associated therewith. This motor 301 is connected, through a clutch 340, with a horizontal shaft 341 which operates the filling means G in known fashion which has not here been illustrated. In addition, this shaft 341 drives the conveyor belts 180 and 187 through a bevel gearing 342, a shaft 343 and two separate chain drives 344 and 345. The bladed conveyor wheel 184, which is secured to a forward shaft 346, is driven through a bevel gearing 347. Furthermore the above mentioned Maltese Cross gearing 232, 233 is driven through a bevel gearing 348, the cross 233 of this gearing being connected through a shaft 349 with one of the rollers 230. The second of these rollers 230 is driven from the shaft 349 through toothed wheels 350, 351, 352, 353. The conveyor wheel 235 is driven by the shaft 341 through a bevel gearing 355 and a shaft 356. This shaft 356 is in turn coupled through a chain drive 357 to the vertical shaft 358 of the conveyor wheel 242.

Finally, the third driving motor 302 operates the closure means K and the conveyor devices H, L and M. For this purpose the motor 302 is coupled to a shaft 360 which, in the first place, drives a toothed crown 363, fastened to the drum 201, through a bevel gearing 361 and a pinion 362. In the second place the shaft 360 drives a vertical shaft 365 through a further bevel gearing 364. The conveyor wheel 247 being fastened to this shaft 365. The shaft 365 is coupled to the shafts 368, 369 of the conveyor wheels 285 and 263 through two chain drives 366 and 367. The driver 371 of a Maltese Cross gearing 372 is likewise rotated through a chain drive 370. This Maltese Cross gearing 371, 372, controls the synchronous indexing steps of the rollers 245 which are connected together by toothed wheels 373, 374, 375 and 376.

I claim:

1. A machine for producing packages of the kind consisting of filled containers each comprising a sleeve-form body portion and top and bottom covers secured thereto in a fluid-tight manner, said machine including, in combination, a supply reel carrying packaging material in strip form, a device operable for continuously forming tubing with an overlap seam from said material fed from the supply reel, a mechanism which travels with said tubing for a predetermined distance and is operable for separating therefrom sleeve-form container body portions, a continuously rotating mandrel wheel, mandrels mounted on said wheel, movable grippers with which said mandrels are equipped, a device which functions to transfer the continuously separated container body portions to the mandrels, the aforesaid grippers functioning to draw the said body portions on to the mandrels, a feed device associated with the mandrel wheel for feeding thereto preformed container bottom covers, a mechanism comprising a continuously rotating series of devices associated with the mandrels and operable for welding said bottom covers to the container body portions, a filling means succeeding the mandrel wheel for filling the containers with contents, a mechanism following said filling means and operable for welding preformed top covers on to the filled but still open containers to close the same, and thus complete the packages, and a feed device associated with the said top cover welding mechanism for feeding thereto said top covers.

2. A machine for producing packages of the kind consisting of filled containers each comprising a sleeve-form body portion and top and bottom covers secured thereto in a fluid-tight manner, said machine comprising, in combination, a supply reel carrying packaging material in strip form, a device for continuously forming tubing with a sealed overlap seam from material drawn from said supply reel, a separating mechanism continuously operating to separate container body portions from said tubing, means for preforming container top and bottom covers from sheet material, mandrel means acting continuously and in synchronization with the separating mechanism for successively removing container body portions from said mechanism in substantially continuous fashion, a feed device for conveying and transporting bottom covers from the cover preforming means to the body portions supported on the mandrel means, means for welding said bottom covers into corresponding separated body portions to produce initially empty containers open at the top, means operating to fill said containers with contents, a conveyor device for transporting in continuous fashion empty containers from the bottom cover welding mechanism to said filling means, a feed device operative to feed filled but still open containers from the filling means to a closure zone, a further feed device conveying and transporting top covers from the aforesaid cover preforming means to said filled containers at the closure zone, and closure means at said zone operating to weld said top covers on to the filled containers to close the same and thus complete the packages.

3. A machine for producing packages of the kind consisting of filled containers each comprising a sleeve-form body portion and top and bottom covers secured thereto in a fluid-tight manner, said machine including, in combination, a supply reel carrying packaging material in strip form, means for longitudinally grooving said packaging material, said means comprising a roller formed with annular grooves and a co-operating roller formed with complementary annular ribs engaging in said grooves, a device operable for continuously forming tubing with an overlap seam from said longitudinally grooved strip material fed from the supply reel, a mechanism which travels with said tubing for a predetermined distance and is operable for separating therefrom sleeve-form container body portions, a continuously rotating mandrel wheel, mandrels mounted on said wheel, movable grippers with which said mandrels are equipped, a device which functions to transfer the continuously separated container body portions to the mandrels, the aforesaid grippers functioning to draw the said body portions on to the mandrels, a feed device associated with the mandrel wheel for feeding thereto preformed container bottom covers, a mechanism comprising a continuously rotating series of devices associated with the mandrels and operable for welding said bottom covers to the container body portions, a filling means succeeding the mandrel wheel for filling the containers with contents, a mechanism following said filling means and operable for welding preformed top covers on to the filled but still open containers to close the same and thus complete the packages, and a feed device associated with the said top cover welding mechanism for feeding thereto said top covers.

4. A package producing machine according to claim 3, wherein a heater, located in advance of the said grooving mechanism, is adapted to pre-heat the strip of packaging material.

5. A machine for producing packages of the kind consisting of filled containers each comprising a sleeve-form body portion and top and bottom covers secured thereto in a fluid-tight manner, said machine including, in combination, a supply reel carrying packaging material in strip form, means for longitudinally grooving said packaging material, said means comprising a roller formed with annular grooves and a co-operating roller formed with complementary annular ribs engaging in said grooves, a heater located in advance of said grooving mechanism to pre-heat the strip of packaging material, a device operable for continuously forming tubing with an overlap seam from said longitudinally grooved strip material fed from the supply reel, said tube forming device including a shaping mandrel, a heater adapted to heat the margins of the strip of packaging material, and pairs of pressing rollers which are so arranged along the said shaping mandrel as to be behind the overlap seam of the tubing, a mechanism which travels with said tubing for a predetermined distance and is operable for separating therefrom sleeve-form container body portions, a continuously rotating mandrel wheel, mandrels mounted on said wheel, movable grippers with which said mandrels are equipped, a device which functions to transfer the continuously separated container body portions to the mandrels, the aforesaid grippers functioning to draw the said body portions on to the mandrels, a feed device associated with the mandrel wheel for feeding thereto preformed container bottom covers, a mechanism comprising a continuously rotating series of devices associated with the mandrels and operable for welding said bottom covers to the container body portions, a filling means succeeding the mandrel wheel for filling the containers with contents, a mechanism following said filling means and operable for welding preformed top covers on to the filled but still open containers to close the same and thus complete the packages, and a feed device associated with the said top cover welding mechanism for feeding thereto said top covers.

6. A package producing machine according to claim 5, wherein, to prevent burning of the strip of packaging material, the heater located in advance of the grooving mechanism and the heater for heating the margins of the said strip are so mounted in the machine as to be turnable away from the strip in the event of travel of the latter being interrupted.

7. A package producing machine according to claim 6, wherein each of the said heaters is pivotally mounted and connected, through thte medium of levers, with an electromagnet which is adapted, upon de-energization, to turn the heater away from the strip.

8. A machine for producing packages of the kind consisting of filled containers each comprising a sleeve-form body portion and top and bottom covers secured thereto in a fluid-tight manner, said machine including, in combination, a supply reel carrying packaging material in strip form, a device operable for continuously forming tubing with an overlap seam from said material fed from the supply reel, a mechanism operable for separating from said tubing sleeve-form container body portions, said separating mechanism including co-operable knife blades relatively movable for preforming cutting operations across and through the tubing and being arranged for longitudinal displacement during a cutting operation for a predetermined distance together with and parallel to the said tubing, a continuously rotating mandrel wheel, mandrels mounted on said wheel, movable grippers with which said mandrels are equipped, a device which functions to transfer the continuously separated container body portions to the mandrels, the aforesaid grippers functioning to draw the said body portions on to the mandrels, a feed device associated with the mandrel wheel for feeding thereto preformed container bottom covers, a mechanism comprising a continuously rotating series of devices associated with the mandrels and operable for welding said bottom covers to the container body portions, a filling means succeeding the mandrel wheel for filling the containers with contents, a mechanism following said filling means and operable for welding preformed top covers on to the filled but still open containers to close the same and thus complete the packages, and a feed device associated with the said top cover welding mechanism for feeding thereto said top covers.

9. A package producing machine according to claim 8, wherein the said knife blades are mounted on continuously rotating crank arms, and the separating mechanism includes a fixed cam rail against which is arranged to run a roller mounted on a carrier arm supporting said knife blades suchwise as to ensure that the latter move rectilinearly in the direction of travel and parallel to the tubing during a cutting operation.

10. A machine for producing packages of the kind consisting of filled containers each comprising a sleeve-form body portion and top and bottom covers secured thereto in a fluid-tight manner, said machine including, in combination, a supply reel carrying packaging material in strip form, a device operable for continuously forming tubing with an overlap seam from said material fed from the supply reel, a mechanism which travels with said tubing for a predetermined distance and is operable for separating therefrom sleeve-form container body portions, a continuously rotating mandrel wheel, mandrels mounted on said wheel, movable grippers with which said mandrels are equipped, a device which functions to transfer the continuously separated container body portions to the mandrels, the aforesaid grippers functioning to draw the said body portions on to the mandrels, a feed device associated with the mandrel wheel for feeding thereto preformed container bottom covers, a mechanism comprising a series of devices associated with the mandrels and operable for welding said bottom covers to the container body portions, said series of devices being continuously rotatable about a vertical central axis which is offset relatively to the longitudinal axis of the tube forming device, a filling means succeeding the mandrel wheel for filling the containers with contents, a mechanism following said filling means and operable for welding preformed top covers on to the filled but still open containers to close the same and thus complete the packages, and a feed device associated with the said top cover welding mechanism for feeding thereto said top covers.

11. A package producing machine according to claim 10, wherein the device functioning to transfer the continuously separated container body portions to the mandrels comprises a fixed folding frame, and means operable to draw the body portions into said frame and to determine their cross-section, the longitudinal axis of said frame being offset relatively to the central axis of the bottom cover welding mechanism.

12. A package producing machine according to claim 11, wherein a rotating counter holder is associated with said folding frame, for the purpose specified.

13. A machine for producing packages of the kind consisting of filled containers each comprising a sleeve-form body portion and top and bottom covers secured thereto in a fluid-tight manner, said machine including, in combination, a supply reel carrying packaging material in strip form, a device operable for continuously forming tubing with an overlap seam from said material fed from the supply reel, a mechanism which travels with said tubing for a predetermined distance and is operable for separating therefrom sleeve-form container body portions, a continuously rotating mandrel wheel, mandrels mounted on and traveling with said wheel, movable grippers with which said mandrels are equipped, a device which functions to transfer the continuously separated container body portions to the travelling mandrels, the aforesaid grippers functioning to draw the said body portions on to the mandrels, said transfer device comprising suction members and being so operable that a container body portion held by said suction members is brought into a position in which the longitudinal axis thereof is disposed at a prearranged obtuse angle to the longitudinal axis of the relevant mandrel moving into the transfer zone, and an edge of the leading open end of the body portion enters the path of travel of the mandrel suchwise that the said leading open end is partially engaged over the mandrel as a result of the travel of the latter, a feed device associated with the mandrel wheel for feeding thereto preformed container bottom covers, a mechanism comprising a continuously rotating series of devices associated with the mandrels and operable for welding said bottom covers to the container body portions, a filling means succeeding the mandrel wheel for filling the containers with contents, a mechanism following said filling means and operable for welding preformed top covers on to the filled but still open containers to close the same and thus complete the packages, and a feed device associated with the said top cover welding mechanism for feeding thereto said top covers.

14. A package producing machine according to claim 13, wherein the said transfer device is arranged for rocking movement in the machine about a pivot in such a way that the suction members move longitudinally and transversely relatively to one another during such rocking movement thereby to open the container body portions which are initially substantially flat.

15. A machine for producing packages of the kind consisting of filled containers each comprising a sleeve-form body portion and top and bottom covers secured thereto in a fluid-tight manner, said machine including, in combination, a supply reel carrying packaging material in strip form, a device operable for continuously forming tubing with an overlap seam from said material fed from the supply reel, a mechanism which travels with said tubing for a predetermined distance and is operable for separating therefrom sleeve-form container body portions, a continuously rotating mandrel wheel, mandrels mounted on said wheel, movable grippers with which said mandrels are equipped, a drum mounted on and coaxial with said mandrel wheel, a device which functions to transfer the continuously separated container body portions to the mandrels, the aforesaid grippers functioning to draw the said body portions on to the mandrels, a feed device associated with the mandrel wheel for feeding thereto preformed container bottom covers, a mechanism comprising a continuously rotating series of devices associated with the mandrels and operable for welding said bottom covers to the container body portions, heat sealing jaws in said bottom cover welding devices, a carrier on said drum for the last mentioned devices, a fixed cam ring located in said drum, connections actuated by said cam ring for operating said heat sealing jaws, each of the aforesaid mandrels being arranged for pivoting on the mandrel wheel through a predetermined angular range, in each case in a plane passing through the axis of rotation of said mandrel wheel whereby the mandrel can be brought axially into a direction at a specific angle to the aforesaid drum, a filling means succeeding the mandrel wheel for filling the containers with contents, a mechanism following said filling means and operable for welding preformed top covers on to the filled but still open containers to close the same and thus complete the packages, and a feed device associated with the said top cover welding mechanism for feeding thereto said top covers.

16. A package producing machine according to claim 15, wherein the movable grippers on the mandrels are so guided for movement and operated that they first draw the container body portions to the mandrels and then, during the rotation of the mandrel wheel, hold said body portions displaceably on the mandrels so that, during welding of a bottom cover, the relevant grippers push the corresponding body portion a small distance from the appropriate mandrel and thereby bring the leading open end of the said body portion, with the bottom cover placed thereon, into a bottom cover welding device whereupon the grippers retract said body portion and finally remove it completely from the mandrel.

17. A package producing machine according to claim 15, wherein there are associated with the bottom cover welding devices means which, in the event of the machine coming to a standstill, move the heat sealing jaws of all of said welding devices into inactive positions.

18. A machine for producing packages of the kind consisting of filled containers each comprising a sleeve-form body portion and top and bottom covers secured thereto in a fluid-tight manner, said machine including, in combination, a supply reel carrying packaging material in strip form, a device operable for continuously forming tubing with an overlap seam from said material fed from the supply reel, a mechanism which travels with said tubing for a predetermined distance and is operable for separating therefrom sleeve-form container body portions, a continuously rotating mandrel wheel, mandrels mounted on said wheel, movable grippers with which said mandrels are equipped, a drum mounted on and co-axial with said mandrel wheel, a device which functions to transfer the continuously separated container body portions to the mandrels, the aforesaid grippers functioning to draw the said body portions on to the mandrels, a feed device associated with the mandrel wheel for feeding thereto preformed container bottom covers, a mechanism comprising a continuously rotating series of devices associated with the mandrels and operable for welding said bottom covers to the container body portions, heat sealing jaws in said bottom cover welding devices, a carrier on said drum for the last mentioned devices, a fixed cam ring located in said drum, connections actuated by said cam ring for operating said heat sealing jaws, means operable to move the heat sealing jaws of all of the bottom cover welding devices into inactive positions in the event of the machine coming to a standstill in an emergency, said last mentioned means comprising a ring located in the drum co-axially with respect to the aforesaid fixed cam ring, rotatable screw-threaded spindles upon which said co-axial ring is mounted, chain and sprocket gearing for coupling together and rotating the screw-threaded spindles for the purpose of moving the co-axial ring up and down the latter to control the connections for operating the heat sealing jaws, an adjusting motor which drives the chain and sprocket gearing and is adapted to be switched on only in such an emergency, a filling means succeeding the mandrel wheel for filling the containers with contents, a mechanism following said filling means and operable for welding preformed top covers on to the filled but still open containers to close the same and thus complete the packages, and a feed device associated with the said top cover welding mechanism for feeding thereto said top covers.

19. A machine for producing packages of the kind consisting of filled containers each comprising a sleeve-form body portion and top and bottom covers secured thereto in a fluid-tight manner, said machine including, in combination, a supply reel carrying packaging material in strip form, a device operable for continuously forming tubing with an overlap seam from said material fed from the supply reel, a mechanism which travels with said tubing for a predetermined distance and is operable for separating therefrom sleeve-form container body portions, a continuously rotating mandrel wheel, mandrels mounted on said wheel, movable grippers with which said mandrels are equipped, a device which functions to transfer the continuously separated container body portions to the mandrels, the aforesaid grippers functioning to draw the said body portions on to the mandrels, a mechanism for pre-forming bottom and top covers from sheet material, a feed device for feeding to the mandrel wheel preformed bottom covers, said last mentioned device comprising a conveyor chain furnished with cover-driving elements and extending from the cover-performing mechanism, an arcuate guide rail extending from the relevant end of said conveyor chain to the circular path of travel of the mandrels and propelling members continuously turnable about an axis disposed centrally in relation to the said guide rail for transporting the bottom covers along the latter, a mechanism comprising a continuously rotating series of devices associated with the mandrels and operable for welding said bottom covers to the container body portions, a filling means succeeding the mandrel wheel for filling the containers with contents, a mechanism following said filling means and operable for welding preformed top covers on to the filled but still open containers to close the same and thus complete the packages, and a feed device associated with the said top cover welding mechanism for feeding thereto said top covers.

20. A package producing machine according to claim 19, wherein the feed device associated with the top cover welding mechanism comprising a conveyor chain furnished with cover-driving elements and extending from the cover-preforming mechanism, an arcuate guide rail extending from the relevant end of said conveyor chain to the relevant path of travel of the container body portions and propelling members continuously turnable about an axis disposed centrally in relation to the said guide rail for transporting top covers along the latter.

21. A machine for producing packages of the kind consisting of filled containers each comprising a sleeve-form body portion and top and bottom covers secured thereto in a fluid-tight manner, said machine including, in combination, a supply reel carrying packaging material in strip form, a device operable for continuously forming tubing with an overlap seam from said material fed from the supply reel, a mechanism which travels with said tubing for a predetermined distance and is operable for separating therefrom sleeve-form container body portions, a continuously rotating mandrel wheel, mandrels mounted on said wheel, movable grippers with which said mandrels are equipped, a device which functions to transfer the continuously separated container body portions to the mandrel, the aforesaid grippers functioning to draw the said body portions on to the mandrels, a feed device associated with the mandrel wheel for feeding thereto preformed container bottom covers, a mechanism comprising a continuously rotating series of devices associated with the mandrels and operable for welding said bottom covers to the container body portions, suchwise as to produce initially empty containers open at the top, a conveyor device for said empty containers comprising a rotating conveyor wheel equipped with propelling members and a fixed arcuate guide rail which is eccentrically disposed with respect to said conveyor wheel and co-operates with the latter to erect the containers to a vertical position, a filling means succeeding the said conveyor device for filling the vertical containers with contents, a mechanism operable for welding preformed top covers on to the filled but still open containers to close the same and thus complete the packages, and a feed device associated with the said top cover welding mechanism for feeding thereto said top covers.

22. A package producing machine according to claim 21, wherein the filling means and the top cover welding mechanism each has, in advance thereof, a device for synchronous feeding of the containers, each such device comprising a pair of rollers having noses and adapted to be driven in synchronism with the machine cycle.

23. A machine for producing packages of the kind consisting of filled containers each comprising a sleeve-form body portion and top and bottom covers secured thereto in a fluid-tight manner, said machine including, in combination, a supply reel carrying packaging material in strip form, a device operable for continuously forming tubing with an overlap seam from said material fed from the supply reel, a mechanism which travels with said tubing for a predetermined distance and is operable for separating therefrom sleeve-form container body portions, a continuously rotating mandrel wheel, mandrels mounted on said wheel, movable grippers with which said mandrels are equipped, a device which functions to transfer the continuously separated container body portions to the mandrels, the aforesaid grippers functioning to draw the said body portions on to the mandrels, a feed device associated with the mandrel wheel for feeding thereto preformed container bottom covers, a mechanism comprising a continuously rotating series of devices associated with the mandrels and operable for welding said bottom covers to the container body portions, a filling means succeeding the mandrel wheel for filling the containers with contents, a mechanism following said filling means and operable for welding preformed top covers on to the filled but still open containers to close the same and thus complete the packages, said top cover welding mechanism comprising a rotating drum, receptacles arranged for movement up and down on said drum and adapted to receive the containers, and welding heads incorporating movable heat sealing jaws which heads are carried by the said drum, are associated with said receptacles and are operable for welding the top covers in the open tops of the containers, and a feed device associated with the said top cover welding mechanism for feeding thereto said top covers.

24. A package producing machine according to claim 23, wherein the top cover welding mechanism includes a device adapted, in the event of the machine coming to a stop, to move the heat sealing jaws into inactive positions.

25. A machine for producing packages of the kind consisting of filled containers each comprising a sleeve-form body portion and top and bottom covers secured thereto in a fluid-tight manner, said machine including, in combination, a supply reel carrying packaging material in strip form, said material consisting of cardboard lined with a heat sealing plastic, a device continuously forming tubing with a sealed overlap seam from said material drawn from said supply reel, a separating mechanism which travels with said tubing for a predetermined distance and continuously operates to cut container body portions from said tubing, a mechanism functioning to preform container top and bottom covers from a thermoplastically deformable sheet material, a continuously rotating mandrel wheel, mandrels mounted on and travelling with said wheel, movable grippers associated with the mandrels, a feed device conveying and transporting bottom covers from said cover-preforming mechanism to the travelling mandrels, the aforesaid grippers functioning to draw the said body portions on to the mandrels, a mechanism comprising a continuously rotating series of devices associated with the mandrels and operable to weld said bottom covers in the separated body portions suchwise as to produce initially empty containers open at the top, a filling means succeeding the mandrel wheel for filling the containers with contents, a conveyor device passing empty containers from said bottom cover welding mechanism to said filling means, a feed device feeding filled but still open containers from the filling means to a closure zone, a further feed device conveying and transporting top covers from the cover-preforming mechanism to said filled containers at the closure zone, and closure means at said zone operating to weld said top covers on to the filled containers to close the same and thus complete the packages.

References Cited in the file of this patent
UNITED STATES PATENTS

| | | |
|---|---|---|
| 2,256,263 | Haycock | Sept. 16, 1941 |
| 2,520,224 | Soussloff et al. | Aug. 29, 1950 |
| 2,580,456 | Noe | Jan. 1, 1952 |
| 2,697,313 | Wilcox | Dec. 21, 1954 |